United States Patent
Faruque et al.

(10) Patent No.: US 10,284,373 B2
(45) Date of Patent: May 7, 2019

(54) SMART GRID SECURE COMMUNICATIONS METHOD AND APPARATUS

(71) Applicant: University of North Dakota, Grand Forks, ND (US)

(72) Inventors: Saleh Faruque, Grand Forks, ND (US); Prakash Ranganathan, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 315 days.

(21) Appl. No.: 15/103,910

(22) PCT Filed: Dec. 12, 2014

(86) PCT No.: PCT/US2014/070109
§ 371 (c)(1),
(2) Date: Jun. 13, 2016

(87) PCT Pub. No.: WO2015/089448
PCT Pub. Date: Jun. 18, 2015

(65) Prior Publication Data
US 2016/0315774 A1    Oct. 27, 2016

Related U.S. Application Data

(60) Provisional application No. 61/915,673, filed on Dec. 13, 2013.

(51) Int. Cl.
*H04L 29/00* (2006.01)
*H04L 9/32* (2006.01)
(Continued)

(52) U.S. Cl.
CPC ............ *H04L 9/3242* (2013.01); *H04L 63/06* (2013.01); *H04W 12/02* (2013.01); *H04W 12/06* (2013.01); *H04W 12/12* (2013.01); *Y04S 40/24* (2013.01)

(58) Field of Classification Search
CPC ....... H04L 9/3242; H04L 63/06; H04W 12/06
(Continued)

(56) References Cited

U.S. PATENT DOCUMENTS 5,850,608 A    12/1998  Faruque
5,886,889 A    3/1999   Faruque
(Continued)

FOREIGN PATENT DOCUMENTS

WO    WO-2015089448 A1    6/2015

OTHER PUBLICATIONS

"International Application Serial No. PCT/US2014/070109, International Search Report dated Apr. 30, 2015", 4 pgs.
(Continued)

*Primary Examiner* — Brandon S Hoffman
*Assistant Examiner* — Michael D Anderson
(74) *Attorney, Agent, or Firm* — Schwegman Lundberg & Woessner, P.A.

(57) ABSTRACT

Apparatus and methods performing secure communications in an energy delivery system. Energy delivery systems may include phasor measurement units (PMU), phasor data concentrators (PDC) along with power generation, transmission and consumption equipment. The PMU and PDC may communicate in a grid network over secured wired or wireless communication protocols. Embodiments may include utilizing spread spectrum communication between PMU devices and PDC devices to sustain energy delivery functionality during a communications attack. Communications security may include a cryptographic key management scheme for secure PMU and PDC communication and identification. Embodiments may include clustering of PMU and PDC data for analysis and real-time presentation to grid operators. Embodiments may include clustering of PMU (Continued)

devices in a hexagonal geometry to provide for frequency reuse among devices with directional antenna.

22 Claims, 18 Drawing Sheets

(51) Int. Cl.
*H04W 12/02* (2009.01)
*H04W 12/12* (2009.01)
*H04L 29/06* (2006.01)
*H04W 12/06* (2009.01)

(58) Field of Classification Search
USPC .......................................................... 713/181
See application file for complete search history.

(56) References Cited

U.S. PATENT DOCUMENTS

| | | | |
|---|---|---|---|
| 7,289,460 B1 | 10/2007 | Thacker et al. | |
| 2005/0141562 A1 | 6/2005 | Chen et al. | |
| 2006/0259255 A1 | 11/2006 | Anderson et al. | |
| 2010/0220856 A1* | 9/2010 | Kruys | H04L 9/0833 380/44 |
| 2010/0253504 A1 | 10/2010 | Lliteras et al. | |
| 2011/0138182 A1 | 6/2011 | Murray et al. | |
| 2011/0282508 A1* | 11/2011 | Goutard | H02J 3/06 700/293 |
| 2012/0020316 A1 | 1/2012 | Dong et al. | |
| 2012/0082048 A1* | 4/2012 | Taft | H04L 12/1836 370/252 |
| 2013/0166910 A1 | 6/2013 | Wilkinson et al. | |
| 2013/0193951 A1 | 8/2013 | Korovin et al. | |
| 2013/0207980 A1 | 8/2013 | Ankisettipalli et al. | |
| 2013/0301688 A1 | 11/2013 | Khandani | |

OTHER PUBLICATIONS

"International Application Serial No. PCT/US2014/070109, Invitation to Pay Additional Fees and Partial Search Report dated Feb. 19, 2015", 2 pgs.
"International Application Serial No. PCT/US2014/070109, Written Opinion dated Apr. 30, 2015", 11 pgs.
Gellerman, Nick, et al., "User Interface for Situational Awareness of openPDC", (2014), 6 pgs.
Ranganathan, Prakash, et al., "A 3 Tier Spectrum Management Scheme and Security Assessment in Synchrophasors", (2014), 1-4.

* cited by examiner

US 10,284,373 B2

SMART GRID SECURE COMMUNICATIONS METHOD AND APPARATUS

CLAIM OF PRIORITY

This patent application is a U.S. National Stage Filing under 35 U.S.C. 371 from International Application No. PCT/US2014/070109, entitled "SMART GRID SECURE COMMUNICATIONS METHOD AND APPARATUS," filed Dec. 12, 2014, which application claims the benefit of priority of U.S. Provisional Patent Application Ser. No. 61/915,673, entitled "SMART GRID SECURE COMMUNICATIONS METHOD AND APPARATUS," filed on Dec. 13, 2013, which is hereby incorporated by reference herein in its entirety.

TECHNICAL FIELD

This document pertains generally, but not by way of limitation, to security for utility grid communications. More particularly, embodiments include a spread spectrum radio communication scheme for secure electric-grid network communications and monitoring.

BACKGROUND

The use of the Internet for communications has become inseparably intertwined with our modern lives, and its use for various purposes is rapidly increasing. Unfortunately, cyber-attacks or other malicious activities involving the Internet, commonly referred to as hacking, are also on the rise. As a result, the community of Internet users is becoming more and more vulnerable to malicious activities.

The electrical power grid that supplies electricity to homes, schools and businesses is no exception to these attacks and vulnerabilities. Electricity is an important component in nearly every aspect of modern life. Accordingly, there is an ongoing need to protect the electrical grid and its associated communications from being compromised by a cyber-attack.

Performance monitoring tools measure power system conditions in many locations in the electrical power grid. Conditions such as frequency, voltage phasors, current phasors and other valuable parameters can be used for state estimation, transient analysis, capacitor-bank performance monitoring, analysis of load shedding schemes, inter-area oscillation control, and other analysis. The growth of the electrical power grid, and the high frequency at which measurements can be obtained, present a need to provide power grid operators with analytical and decision making tools that can aid them in gathering, classifying and analyzing the power system conditions as quickly as possible.

OVERVIEW

Systems and methods of secure communication utilizing spread spectrum communication between Phasor Measurement Unit (PMU) units and Phasor Data Concentrator (PDC) units. Spread Spectrum communication is a form of wireless communication in which the frequency of the transmitted signal is deliberately varied and spread over wide frequency band. Because the frequency of the transmitted PMU data signal is deliberately varied, spread spectrum communication may be utilized to optimize the efficiency of bandwidth within a frequency range, and also provides security benefits. A secure communication signal can be demodulated at the Phasor Data Concentrator (PDC) side for data recovery. This approach addresses various cyber threats such as denial of service (DoS) or flooded attacks in an electric power grid communication.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
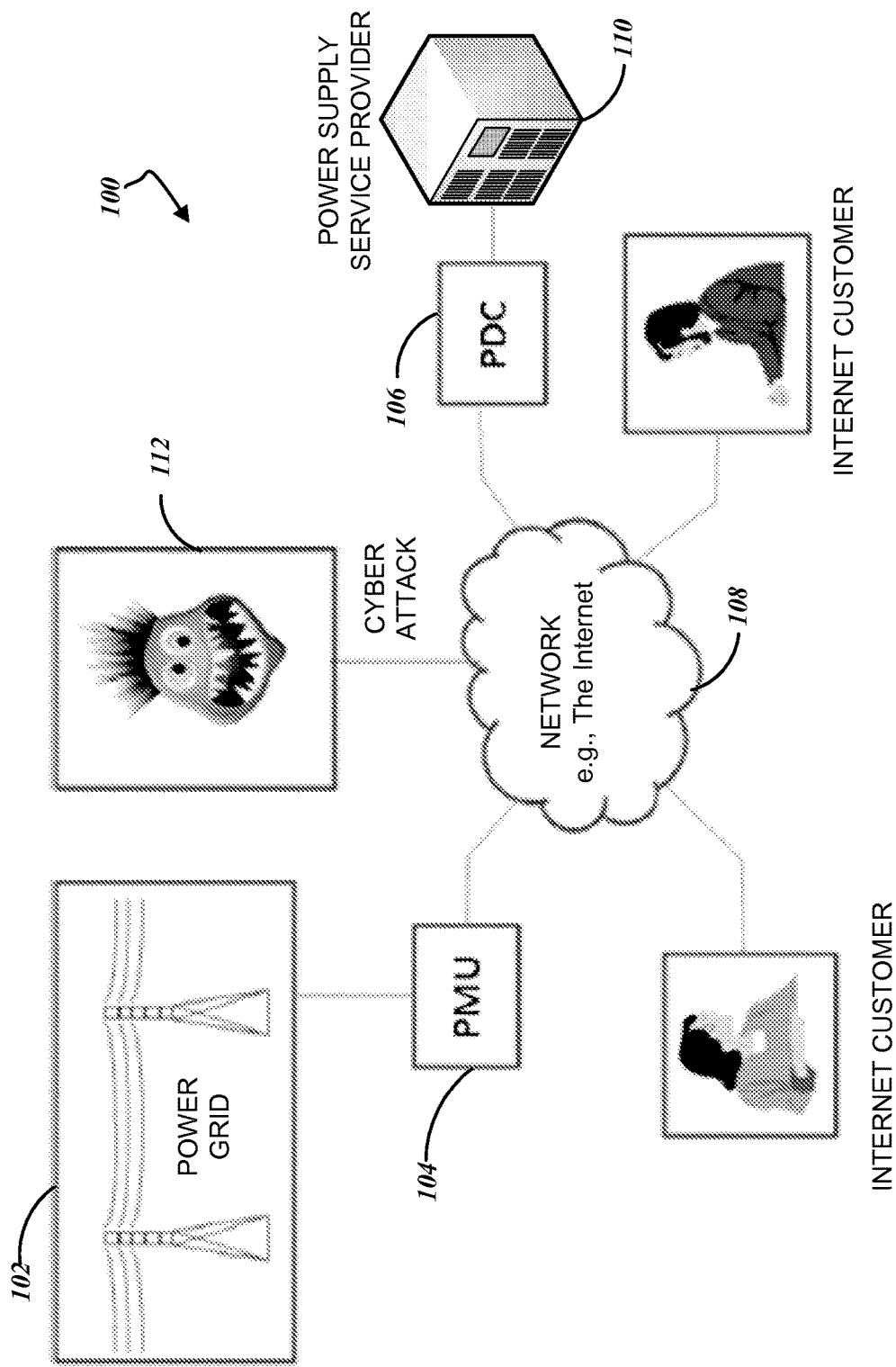
FIG. 1 is a block diagram of an example network based communication system, in accordance with some embodiments.

Electric power infrastructure is undergoing changes that will unfold over a number of years. As the electric grid is modernized, it will become highly automated, leverage information technology more fully, and become more capable in managing energy from a variety of distributed sources. However, in this process of becoming increasingly smarter and more connected, the electric grid will expand to generate more data and contain more complex interconnections that may become portals for intrusions, error-caused disruptions, malicious attacks, and other threats. Effective strategies for monitoring electric distribution equipment and securing the computing and communication networks that will be central to the performance and availability of the envisioned electric power infrastructure, and protecting the privacy of Smart Grid-related data, are needed.

A synchrophasor, also referred to as a phasor measurement unit (PMU), is a sensor placed on a transmission line that tracks voltage, current, phase and frequency information of the transmission line. In order to have situational awareness of a smart electric grid, a utility operator must monitor the data delivered by the synchrophasor in real-time. Time-stamped synchronized data measurements provide for performance of event prediction and post-event analysis.

Multiple phasor measurement units (PMUs) can provide time-synchronized measurements of a power system such as frequency, voltage phasors, current phasors and other valuable parameters that can be used for state estimation, transient analysis, capacitor bank's performance, analysis of load shedding schemes, and inter-area oscillations. A basic PMU measurement can be obtained at a rate of at least thirty samples per second. With these multiple and frequent data samples, system and grid operators (SGO) can observe any anomalies in frequency, voltage or current in the grid to enhance the situational awareness of the grid. In an example, the use of data analytics to detect these anomalies may provide a tool for SGOs to reduce the frequently occurring brownouts/blackouts. Although, PMU can provide information on the system conditions, the SGOs need visual analytical and decision tools that can aid them to gather, classify and analyze the data samples to make decisions in real-time.

Currently, the TCP/IP protocol (Transmission Control Protocol (TCP)/Internet Protocol (IP)) is commonly used to communicate between devices in an electric grid. Routable protocols, such as TCP/IP, use addresses that typically have at least two parts: a network address and a device address. Routable protocols allow devices to communicate between two different networks by forwarding packets between the two networks. Non-routable protocols typically only use a device address, and generally do not allow messages to be sent from one network to another, thus allowing communications to take place only on a single network. Routing takes place at a routing layer in the network devices, thus using a routing protocol, such as IP, to route data from one local area network to another. In general, the TCP/IP protocol has vulnerabilities that make it susceptible to a variety of attacks, such as denial-of-service (DOS) attacks, dictionary attacks, Sybil attacks, and message manipulation attacks.

The term Sybil attack denotes an attack where the attacker tries to forge multiple identifications in a certain device or in multiple devices within a region. For example, if a sufficient number of phasor measurement unit (PMU) nodes are infected with a Sybil-like virus, an attacker may be able to completely alter the aggregate reading of the phasor data concentrator (PDC). Depending on the number of nodes the attacker infects or controls, he or she may be able to determine the outcome of any vote, either claim a legitimate node is misbehaving or Sybil nodes can vouch for each other.

A denial-of-service attack includes attacks that flood the system with repeated attempts using the same bogus name. By flooding the system with too much traffic, the server(s) in the system cannot maintain an acceptable level of responsiveness causing the system to become or appear unavailable. A dictionary attack is a brute force attack that uses common words as possible passwords or decryption keys and provides a more efficient way of discovering a user's passcode. If a valid password or key is determined by an attacker, the system is then vulnerable to malicious behavior and at a greater risk of being sabotaged. For example, the loss of the integrity of sensitive PMU data may compromise the security of the power grid. This may include a physical impact of compromising the PMU and a corresponding situational awareness system. In an example worst case scenario, a compromised PMU could lead to cascading failures of sub-systems or other equipment in the power grid. In response to these hazards, techniques are discussed herein to minimize or prevent the likelihood of a successful attack, and also to maintain authenticated communications between system components.

FIG. 1 is a block diagram of an example network based communication system 100. Power grid 102 may include a PMU (Phasor Measurement Unit) 104 that provides data communication to a PDC (Phasor Data Concentrator) 106. Multiple PMU and PDC may be distributed throughout the power grid 102. The PMU 104 and the PDC 106 may utilize an Internet protocol for data communication over a network 108, such as the Internet or a private network.

Each phasor measurement is time stamped to utilize a Global Positioning System (GPS) universal time; when a phasor measurement is time stamped. This allows measurements taken by PMUs in different locations or by different owners to be synchronized and time-aligned, then combined to provide a precise, comprehensive view of an entire region or interconnection. PMUs samples may be obtained very frequently, for example, at rates of thirty to one-hundred-twenty observations per second.

A power supply service provider 110 may be coupled directly to the PDC 106, or communicate with the PDC 106 over the network 108 via wired or wireless communication technologies. The PMU 104 and PDC 106 may provide data to service provider 110. The PMU 104 and PDC 106 may each be assigned unique identifiers to facilitate encrypted and authenticated communication over the network 108. The power supply service provider 110 may utilize system 100 to monitor electric power usage by consumers, detect cyber-attacks 112, and take appropriate measures in response to changes in power usage or attacks.

Wide area monitoring systems, such as system 100, may include installation of multiple phasor measurement units (PMUs) and substation phasor data concentrators (PDCs). PMUs and substation PDCs are networked appliances that use routable protocols to communicate. PMUs and substation PDCs may become the target of attacks against bulk electric power systems. Threats against these devices may include denial of service attacks, attacks against open ports and services intended to elevate privilege, attempts to change device settings, attempts to inject malicious device commands, attempts to hijack device access credentials or other confidential information, and attempts to place a man-in-the-middle between devices.

In an example, a strong intrusion detection and prevention mechanism may be used to defend against cyber-attacks while sustaining energy delivery function carried by Phasor Measurement Units (PMU). The addition of security features to PMU devices that utilize attack resilient techniques to mitigate any cyber-attacks within acceptable duration set by the North American Electric Reliability Corporation—Critical Infrastructure Protection (NERC-CIP) standards. The energy impact of such a method will yield increased security in the existing grid.

Figure 2:
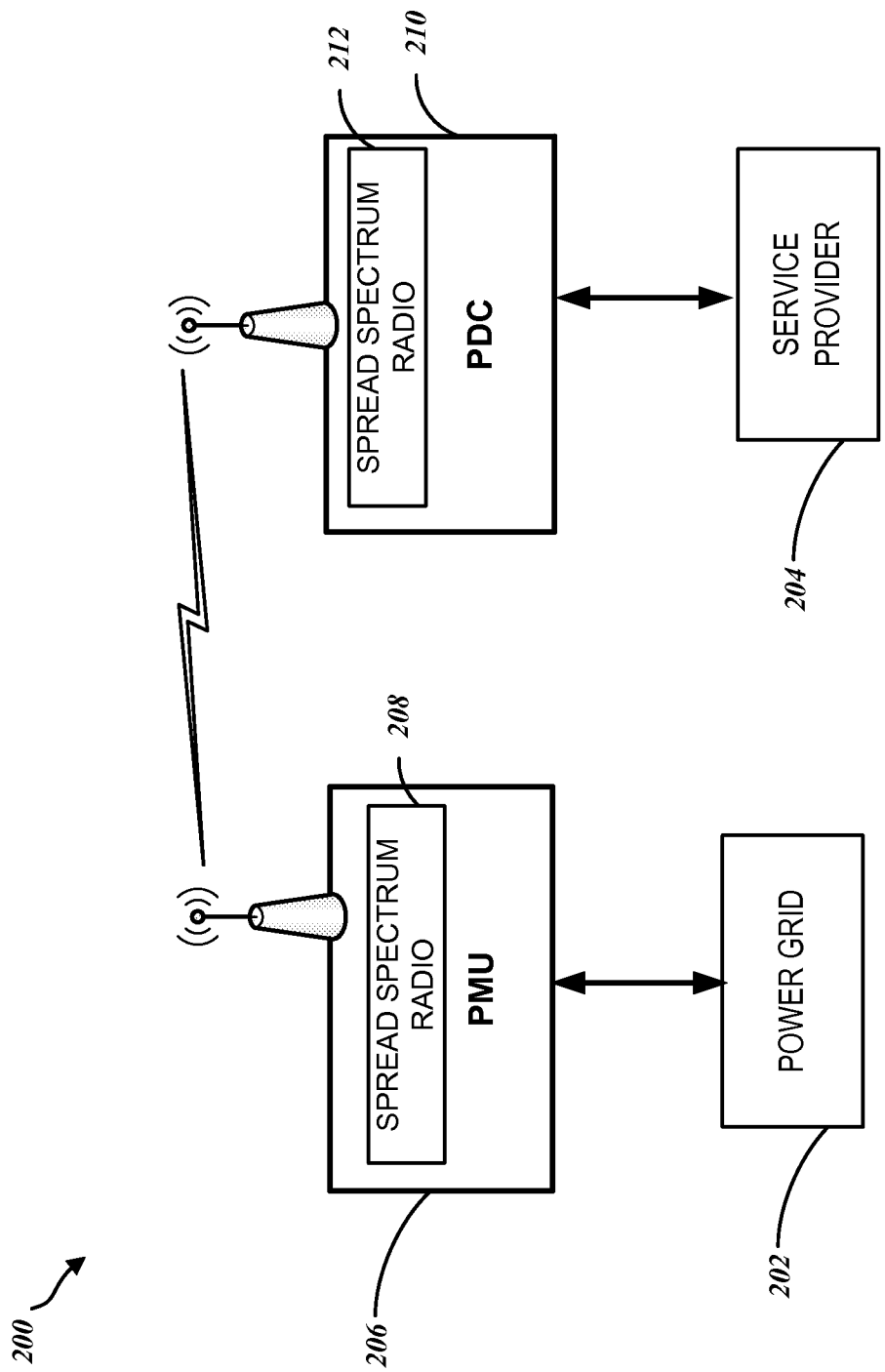
FIG. 2 is a block diagram of an example secure wireless communication system, in accordance with some embodiments.

FIG. 2 is a block diagram of an example secure wireless communication system 200 in accordance with some embodiments. The system 200 may include a power grid 102 that is monitored by a service provider 204. The power grid 102 may utilize one or more PMU (Phasor Measurement Units) 206 that include a spread spectrum radio 208 to communicate with a PDC (Phasor Data Concentrator) 210 that also includes a compatible spread spectrum radio 212. The PMU 206 and the PDC 210 may utilize the spread spectrum radio 208 and the spread spectrum radio 212 to perform data communication that is encrypted. The spread spectrum radio 208 and the spread spectrum radio 212 may utilize a frequency-hopping protocol, or configured with a code or password that is periodically or continuously changed, to avoid jamming, interference, impersonation, interception, or other attacks on communications between the PMU 206 and the service provider 204.

In an example, a communication channel utilizing a routing protocol with a keying scheme may be utilized by the PMU 206 and the PDC 210 to further secure communication. Such a security measure may provide grid operators (e.g., service provider 204) with real-time grid conditions, and early evidence of changing threats or conditions and emerging grid problems, thereby allowing the grid operators to manually diagnose, implement and evaluate remedial actions to protect system security and reliability. The PMU 206, the PDC 210, or the power grid 202 may be configured to automatically diagnose, implement and evaluate remedial actions to protect system security and reliability. Although the system 200 is depicted with a single PMU 206 and single PDC 210 the techniques and processes discussed herein are scalable to accommodate additional PMU units without impeding energy delivery functionality.

In an example, service provider 204 may include an Intrusion Detection System (IDS) configured to communicate with PDC 201 and PMU 206. The IDS may be configured to perform techniques that automate an intrusion detection process.

In an example, service provider 204 may include an intrusion prevention system (IPS) may be configured to include all the capabilities of the IDS, and can also be configured to attempt to stop possible attacks. IDS and IPS techniques may include many of the same capabilities, and administrators may configure one or more prevention features in an IPS module, thereby causing the IPS module to function as an IDS. Intrusion prevention may help to ensure the accuracy and integrity of system 200 capabilities including: billing data, market information, system measurement, and control information. By incorporating IPS functionality security threats may be combatted by blocking and preventing various cyber-attacks, such as Sybil, dictionary, denial-of-service and other similar cyber-attacks.

The availability of communication channels (e.g., access to individual devices such as PDC 201 and PMU 206) is also an important feature for utility delivery systems, including control applications. Confidentiality features may also be utilized in order to protect user consumption and financial data. Non-repudiation techniques may be utilized in inter-domain systems where applications, individuals or organization may be held responsible for any fraudulent actions. Additionally, authentication may be utilized to ensure that malicious individuals are not able to manipulate critical systems or information.

In an example, data gathered from PMU 206 may be protected through attack resilient control algorithms, such as cipher based message authentication (CMAC). A cipher based message authentication code (CMAC) may be used to test the communication among PMUs (e.g., PMU 206 of FIG. 2) and a PDC 210. The use of a CMAC algorithm may prevent inconsistencies and inter-operability in a smart grid environment. The CMAC algorithm may be determined based on the choice of an underlying symmetric key block cipher. The CMAC algorithm is thus a mode of operation (a mode, for short) of the block cipher. The CMAC key is the block cipher key (the key, for short) that may be utilized as part of the security control in PMU units.

For any given key, the underlying block cipher of the mode consists of two functions that are inverses of each other. The choice of the block cipher includes the designation of one of the two functions of the block cipher as the forward function/transformation, and the other as the inverse function, as in the specifications of the Advanced Encryption Standard (AES) algorithm and Triple Data Encryption Algorithm (TDEA). The CMAC mode does not employ the inverse function.

Figure 3:
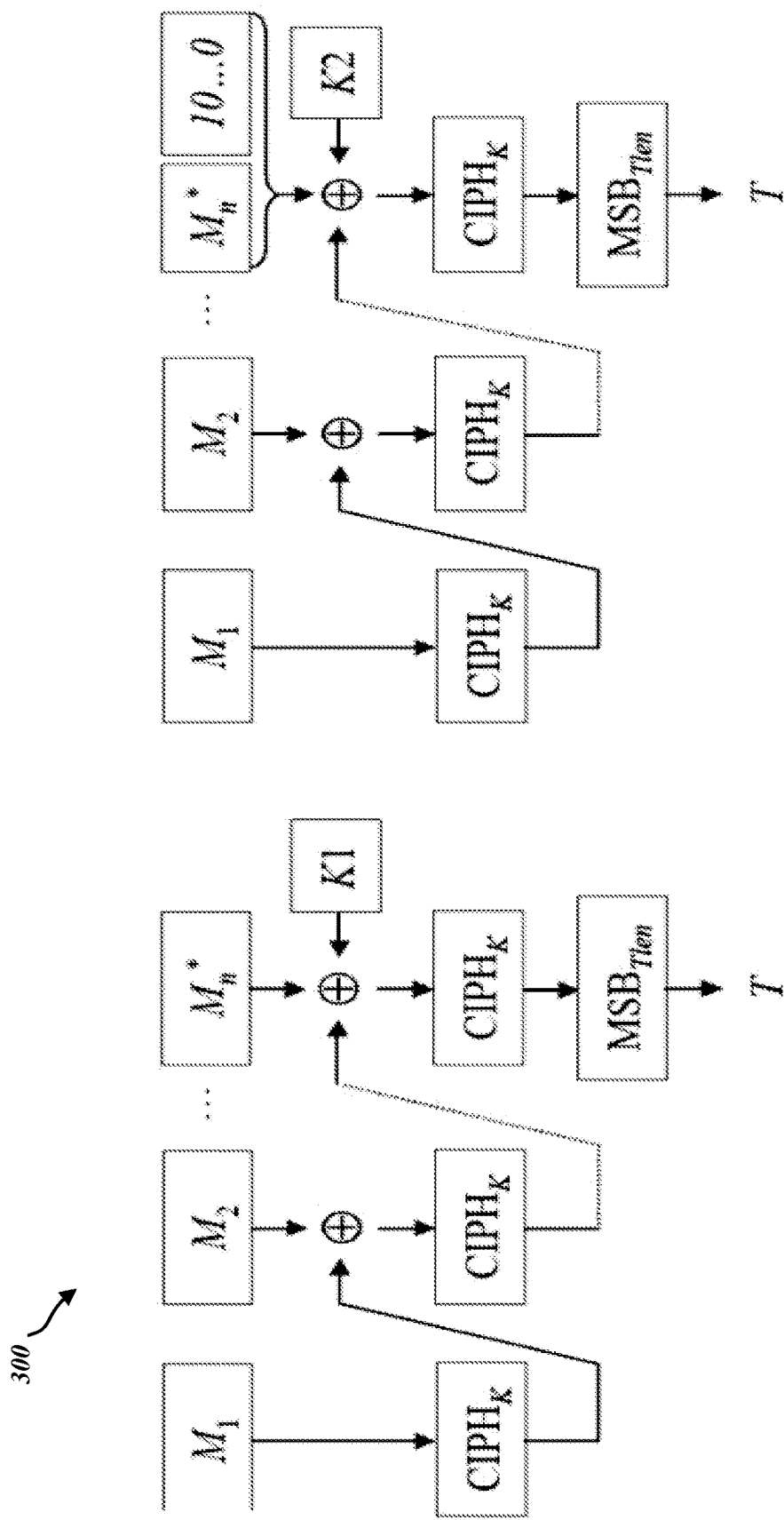
FIG. 3 is a flow diagram illustrating an example method for generating MAC keys, in accordance with some embodiments.

The forward cipher function is a permutation on bit strings of a fixed length; the strings are called blocks. The bit length of a block is denoted b, and the length of a block is called the block size. For the AES algorithm, b=128; for the Triple Data Encryption Algorithm (TDEA), b=64. The key is denoted as K, and the resulting forward cipher function of the block cipher is denoted as CIPHK. The underlying block cipher shall be approved, and the key shall be generated uniformly at random, or close to uniformly at random so that each possible key is (nearly) equally likely to be generated. FIG. 3 is a flow diagram illustrating an example method 300 for generating MAC keys.

The notations M in FIG. 3 represent messages in blocks. The key may be secret and shall be used exclusively for the CMAC mode of the chosen block cipher. To fulfill the requirements of the key, the key should be assigned to the devices that will exchange information (e.g., PMU 206 and PDC 210 of FIG. 2) by a secure key management structure within system 200. Thus the combination of CMAC key management and RSSI approach will defend securely against the Sybil attack during PMU and PDC communication.

In addition, intra-cluster routing between PMU and PDC may be performed when each PMU sensor has one shared-key with every neighbor PMU sensor. For example, two neighbor PMU sensors u and v, and denote their shared-key as $K_s$. If node ID u<v. PMU sensors u and v may perform the following two-way handshake before exchanging any data:

1) The PMU sensor with smaller node ID (PMU u) sends a challenge message to (PMU v): $\{u, N_0\}K_s + MAC(K_s)$, where nonce $N_0$ is a one-time random number generated by u, and $MAC(K_s)$ denotes the Message Authentication Code (MAC) generated from message using key $K_s$.

2) PMU v then replies with a response message to u: $\{v, K_{u,v}, K_v^b, N_0+1\} K_s + MAC(K_{u,v}, K_v^b)$, where $K_{u,v}$ and $K_v^b$ are keys generated by v. $K_{u,v}$ is the new pairwise shared-key used for the later communication between u and v, and $K_v^b$ is a broadcast key for v. These security features may be included during the transitioning stages by time-stamping and node-ID specifier.

A wireless Intrusion Detection and Prevention system may monitor phasor related wireless network traffic and analyzes traffic over wireless networking protocols to identify and stop suspicious activities involving the protocols themselves. A received signal strength indicator (RSSI) based solution for Sybil attacks is therefore provided in such a way that it does not burden the WSN with shared keys or require piggybacking of keys to messages. In an example, upon receiving a message, the receiver will associate the RSSI of the message with the sender-ID included in the message, and later if another message with same RSSI but with different sender-ID is received the receiver can detect a potential Sybil attack.

In a less computationally demanding example, a calculation of sender's position may be eliminated. For example, computation requirements may be related by avoiding calculation of fading through distance, for example a Sybil PMU node attempting to impersonate other PMU nodes by broadcasting messages with multiple node identifiers (ID). In contrast to existing solutions which are based on sharing encryption keys, a robust and lightweight solution for the Sybil attack problem based on the received signal strength indicator (RSSI) readings of messages is provided. This solution based on network simulation will yield robust results since it detects all Sybil attack cases and reduces the occurrences of false positives. This solution is lightweight in the sense that alongside the receiver, the collaboration of one other node (i.e., only one message communication) is needed for this protocol. It will be shown that even though RSSI is time-varying and unreliable in general and radio transmission is non-isotropic, using the ratio of RSSIs from multiple receivers it is feasible to overcome the stated problems.

Figure 4:
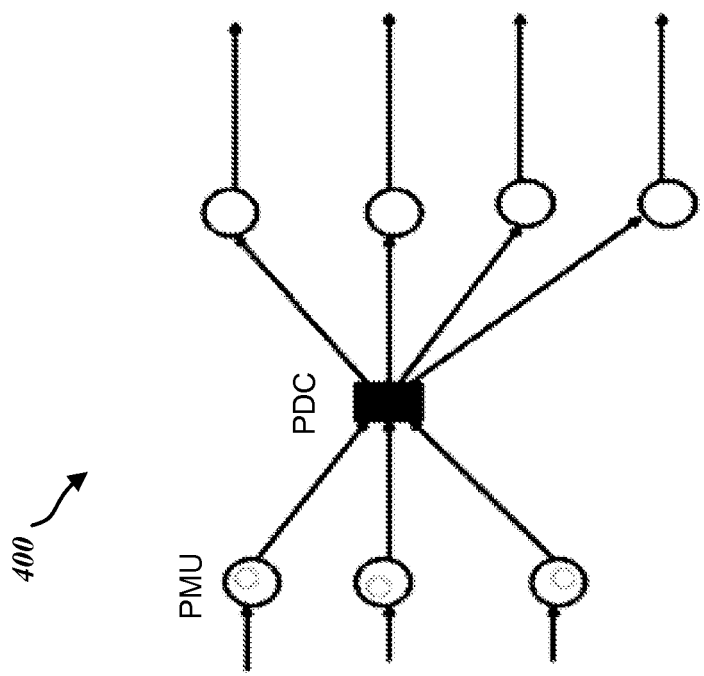
FIG. 4 is a block diagram of an example communication flow, in accordance with some embodiments.
Figure 4:
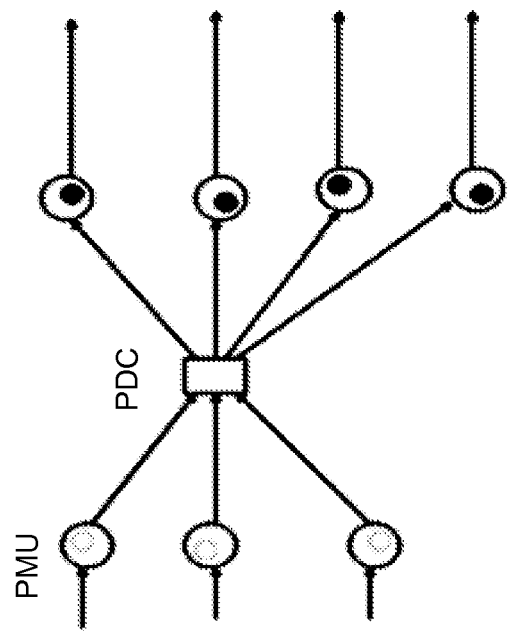

FIG. 4 is a block diagram of an example communication flow 400 between multiple PMUs and a PDC. In a Sybil attack, a single PMU node may present multiple identities to other nodes, such as the PDC, in the network. Through the use of the authentication techniques discussed herein, one node cannot pretend to be other nodes, i.e., when a sensor node u sends a packet to another node v, node u must present a MAC that is computed using the shared pair wise key K(u, v) between node u and node v. A CMAC algorithm to establish secure communication process between PMUs and PDCs can be thereby be provided both in a PMU and at an aggregator side PDC, as shown in FIG. 4.

Figure 5:
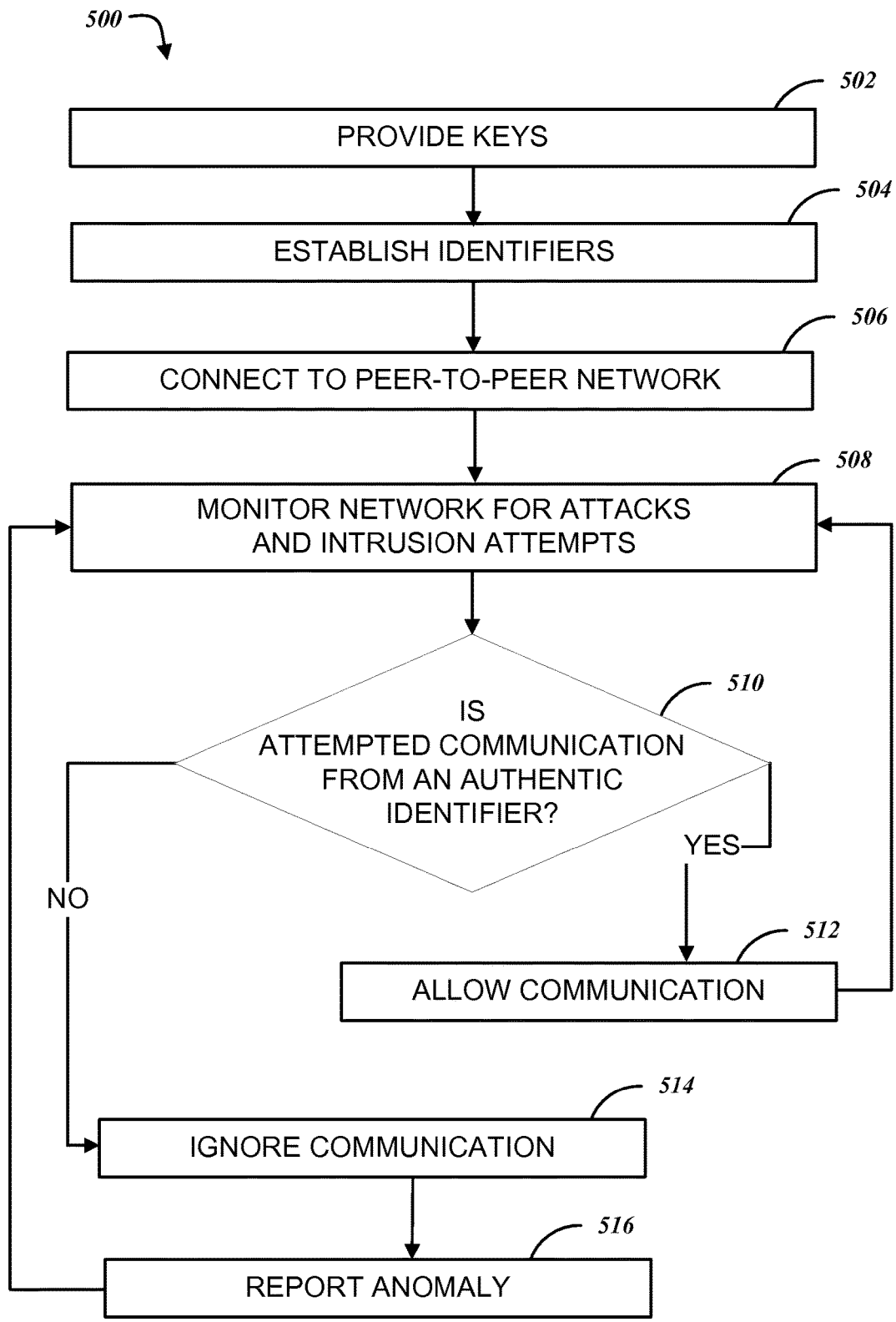
FIG. 5 is a flow diagram illustrating an example method for establishing secure communications in an electrical grid, in accordance with some embodiments.

FIG. 5 is a flow diagram illustrating an example method for establishing secure communications in an electrical grid. At 502, each PMU and PDC is provided with a key that is unique to each device. At 502, identifiers are established. For example, shared pair wise key may be computed for two adjacent devices. At 506, each PMU or PDC may connect to a peer-to-peer network. The connection may be established through the use of the keys and identifiers.

At 508, each device may monitor the network for attacks or intrusion attempts. For example, at 510, a device may check to determine whether any attempted communication is from an authentic identifier. The authenticity of the identifier may be determined by calculating the pair wise key that corresponds to the purported identity. At 512, in response to a determination that the identifier is authentic the communication may be allowed. At 514, in response to a determination that the identifier is inauthentic, or faked, an anomaly may be reported. The report may be broadcast to a supervisory unit or logged internally at the device.

Figure 6:
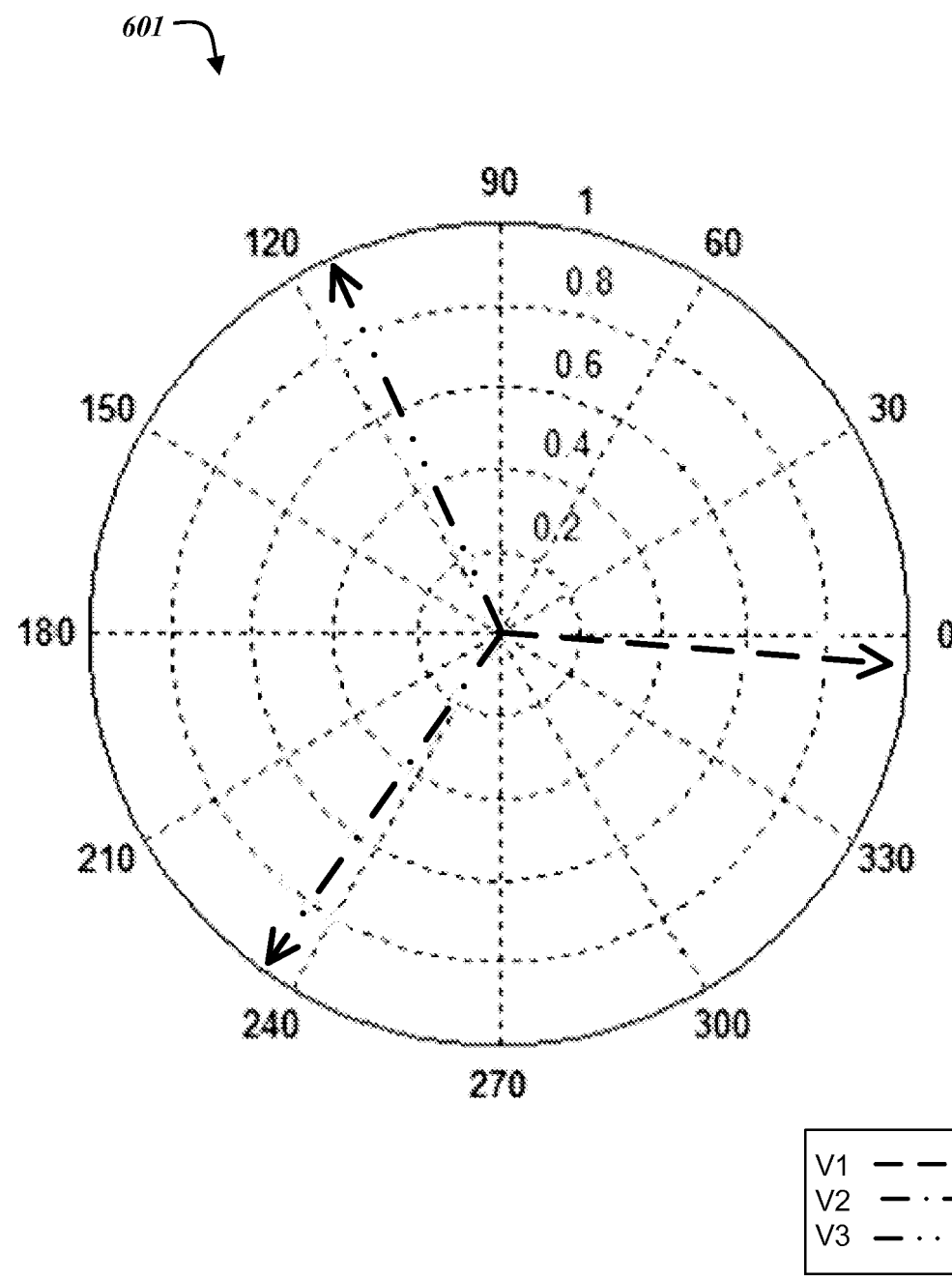
FIG. 6 depicts a unit circle diagram, in accordance with some embodiments.

FIG. 6 depicts a unit circle diagram 601 that depicts three phi (φ) voltage phasors (V1, V2, V3). The lengths of each arrow in the unit circle diagram 601 represent voltage magnitude and angular deviation that can be viewed. Due to the large amount of data generated by an electric grid of any useful size, it is not practical to monitor every data point, which may fluctuate depending on various conditions, nor is it desirable to leave any useful data that may warn of an impending event unmonitored. The unit circle diagram 601 can provide a visual representation of data that is intuitive and communicates the gathered data to an observer accurately and clearly.

Figure 7:
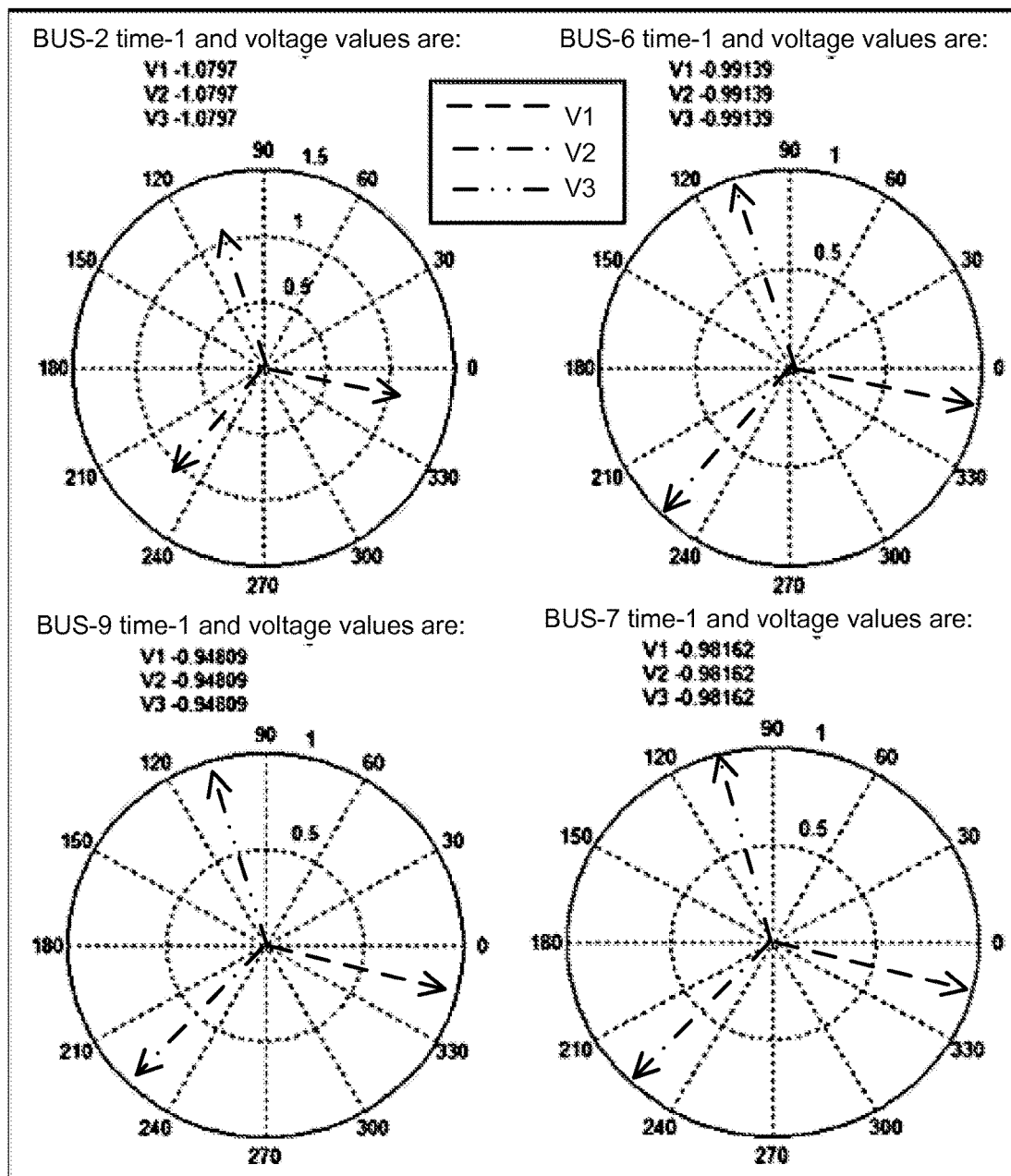
FIG. 7 depicts a display including four unit circle diagrams that represent the voltages from four individual buses in a multi-buss system, in accordance with some embodiments.

FIG. 7 depicts a display 701 including four unit circle diagrams that represent the voltages from four individual buses in a multi-buss system. Each of the unit circle diagrams represents three-φ voltages (V1, V2, V3) that may be depicted in different colors (e.g., red, blue and green, respectively) for easy or quick identification. Each unit circle diagram may depict the bus voltages at specified time periods. Data generated in the grid can be visually represented unit circle diagrams or other forms, so that the system operators can quickly understand the events as they are happening in real-time.

Figure 8:
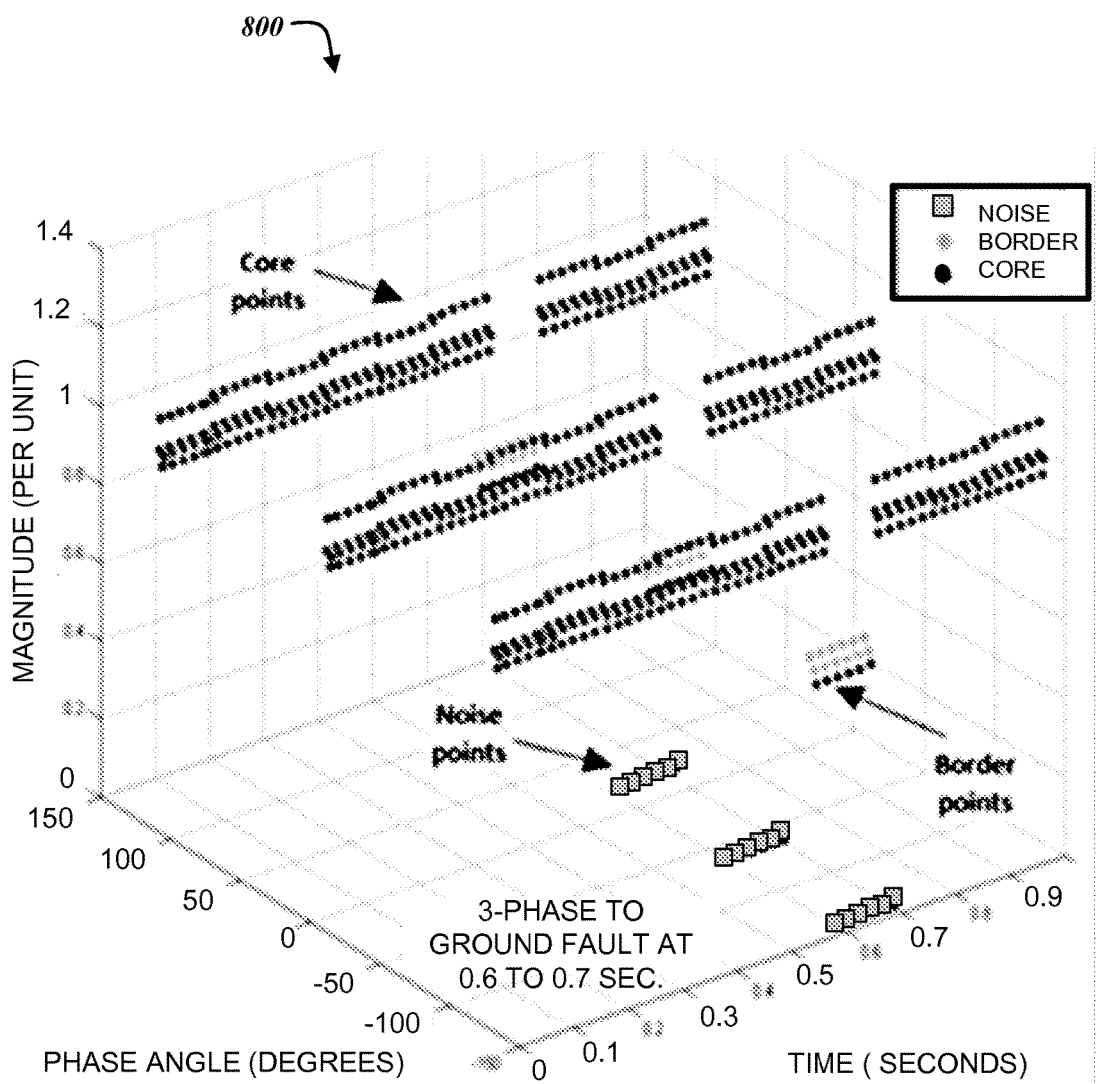
FIG. 8 depicts a three-dimensional scatter plot of data from an example electric utility system, in accordance with some embodiments.

FIG. 8 depicts a three-dimensional scatter plot 800 of data from an example electric utility system. The nominal voltages at ideal conditions are one p.u. and three-hundred kilo-volts respectively. Under real conditions, the values are little off from actual values (e.g., approximately 0.98 p.u. and 299.5 k volts).

Clustering is a process of grouping the data into clusters, so that objects within a cluster have high similarity in comparison to one another but are very dissimilar to objects in other clusters. The advantages of clustering schemes in high streaming data rate applications such as synchrophasors are useful to detect key features (e.g., bad vs. good data, faults, or cyber threats) that distinguish different groups of clusters.

A density based clustering technique based on the temporal data structure of synchrophasors can track parameters both in real-time and off-line analysis. For example, a DBSCAN (density-based spatial clustering of applications with noise) clustering algorithm can be utilized present a visualization of activities in an electric grid system. An example DBSCAN algorithm is discussed in "A Density-Based Algorithm for Discovering Clusters in Large Spatial Databases with Noise," by M. Ester, H. Kriegel, J. Sander, and X. Xu, Kdd, 1996. The classification and clustering of data can be used to extract patterns describing important data classes, or to predict future data trends in the system. Clustering is a process of grouping the data into clusters, so that objects within a cluster have high similarity in comparison to one another but are very dissimilar to objects in other clusters. An advantage of utilizing clustering schemes in streaming data rate applications such as synchrophasors is the ability to detect events (e.g., bad vs good data, equipment faults, or cyber threats) that distinguish different groups of clusters. Such event detection can help provide SGOs with a better understanding of the data and the system in operation.

Figure 9:
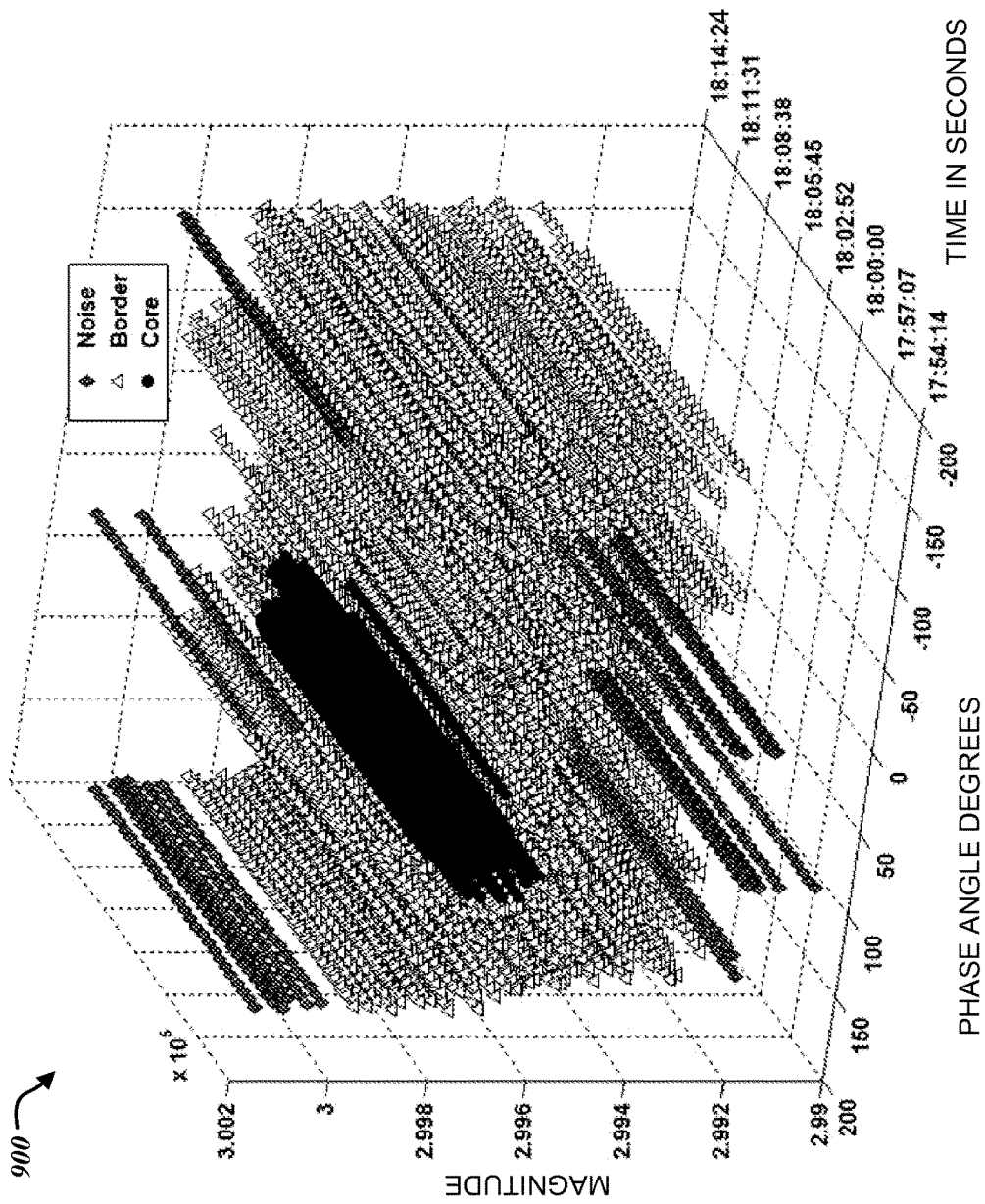
FIG. 9 depicts a three-dimensional scatter plot of data from an example electric utility system, in accordance with some embodiments.

FIG. 9 depicts a three-dimensional scatter plot 900 of data from an example electric utility system. The use of density based clustering algorithms to analyze the temporal data structure of synchrophasors can be used to track parameters both in real-time, and to perform historical or off-line analysis. The DBSCAN algorithm clusters the data into three types: core points (circle), border points (triangle) and noise points (diamond). All these points are clustered based on the two parameters called as ε (Eps) and Minpts. The noise (diamond) points are the unwanted points caused due to bad data that is further away in distance from the majority of the good core points (circle).

Figure 10:
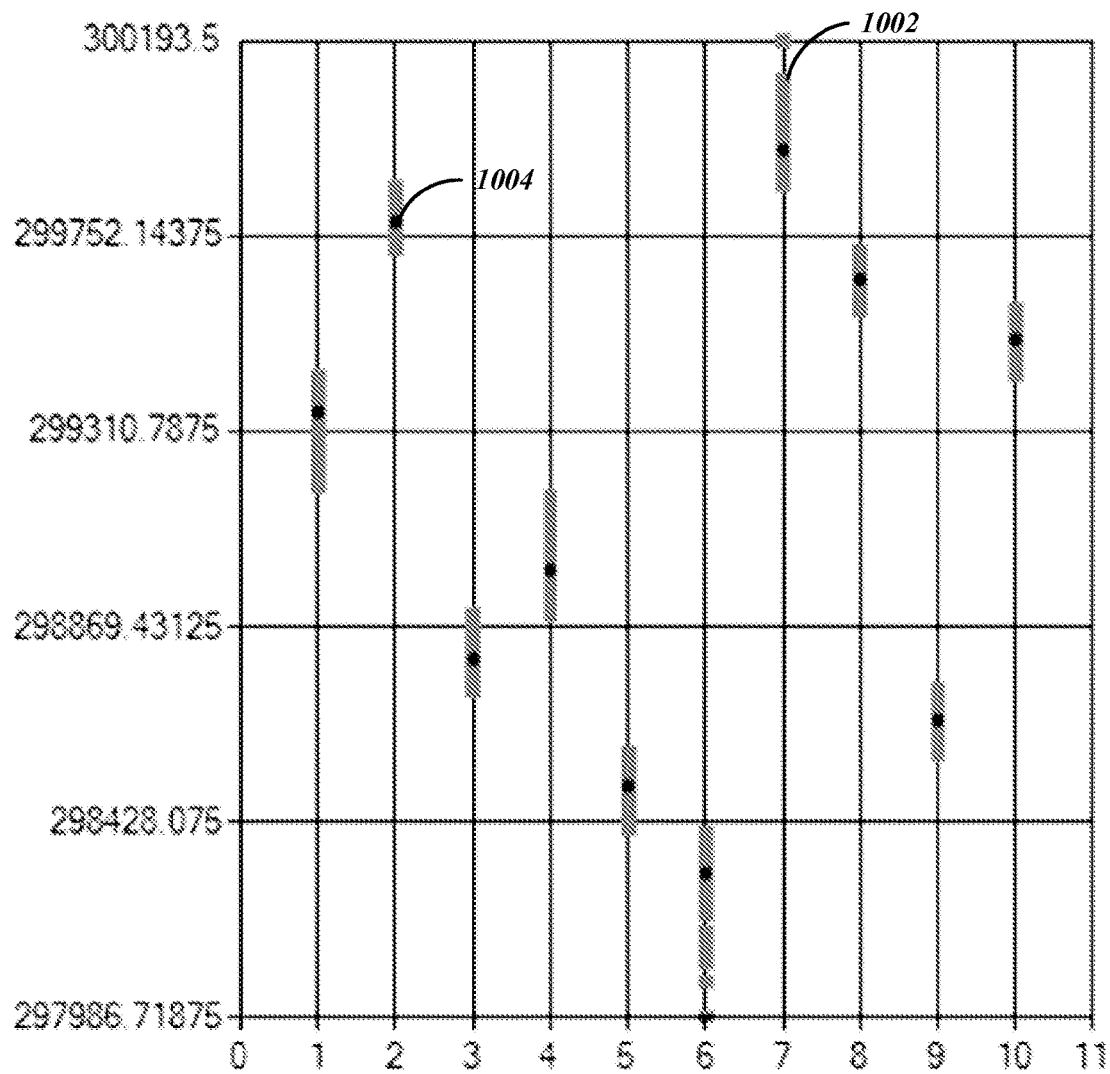
FIG. 10 depicts a graph 1000 of voltage data clusters, in accordance with some embodiments.
Figure 11:
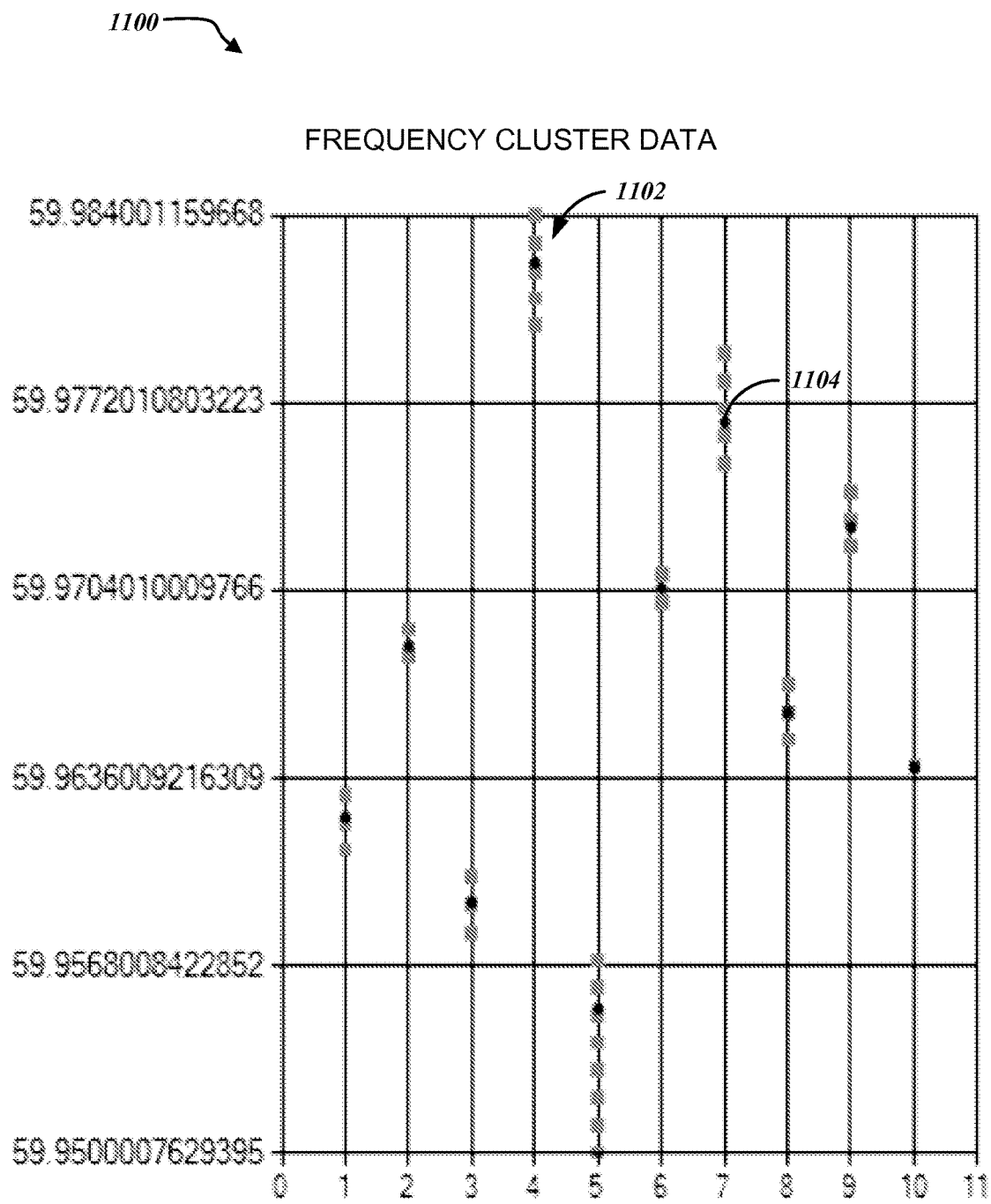
FIG. 11 depicts a graph 1100 of frequency data clusters, in accordance with some embodiments.
Figure 12:
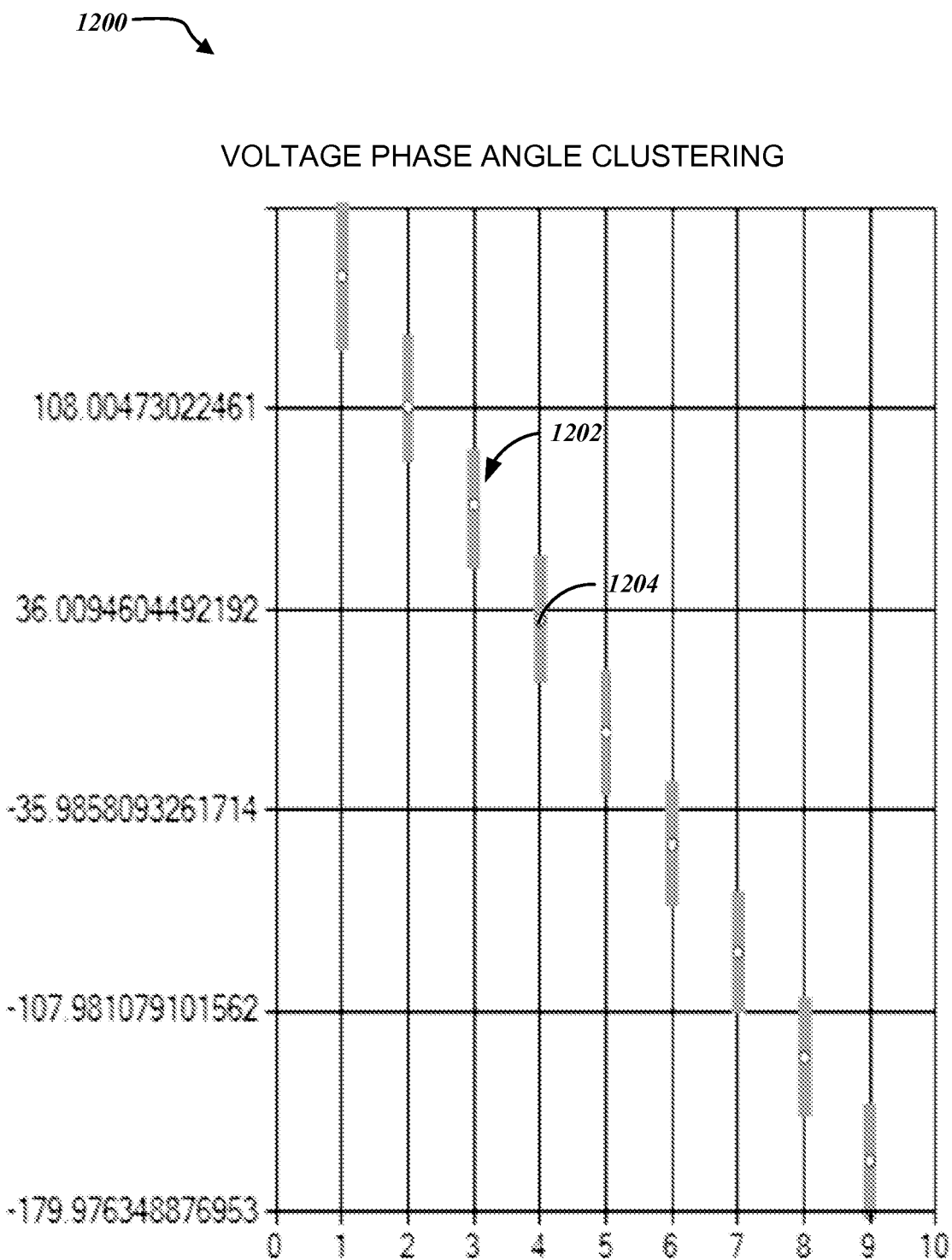
FIG. 12 depicts a graph 1200 of phase angle data clusters, in accordance with some embodiments.

FIG. 10 depicts a graph 1000 of voltage data clusters, where each vertical cluster 1002 includes a centroid 1004. A k-means algorithm may be executed to group the individual data points in each cluster 1002 and plot the centroid 1004 for the cluster 1002. FIG. 11 depicts a graph 1100 of frequency data clusters, where each vertical cluster 1102 includes a centroid 1104. In a typical system, the frequency may typically be stable such that the sampled data does not deviate more than a few one-hundredths during stead state conditions. In the example depicted in FIG. 11 the clusters are grouped near 59.9 Hz. FIG. 12 depicts a graph 1200 of phase angle data clusters, where each vertical cluster 1202 includes a centroid 1204.

In FIGS. 10, 11 and 12, the X-axis presents the number of clusters that are formed. The Y-axis presents the parameter being clustered. An example clustering technique may be performed by using a k-means algorithm. For example:

```
Do {
    changed = false;
    // Empty out clusters
    foreach (List<double> cluster in clusters) {
        cluster.Clear;
    }
    // Distribute data points through
foreach (double datum in data) {
    closest = 0;
    // Find nearest centroid for each data point
    for (int i = 1; i < numOfClusters; i++) {
        if (Math.Abs(datum − centroids− centroids[closest] ) >
            Math.Abs(datum − centroids[i])) {
            closest = i;
        }
    }
    clusters[closest].Add(datum);
    // Add data point to appropriate
}
// Find the new centroids for each cluster
for (int i = 0; i < numOfClusters; i++) {
    if (clusters[i].Any( ) && clusters[i].Average( ) != centroids[i]) {
        clusters[i].Average( );
        changed = true;
    }
}
} while (changed);
```

Figure 13:
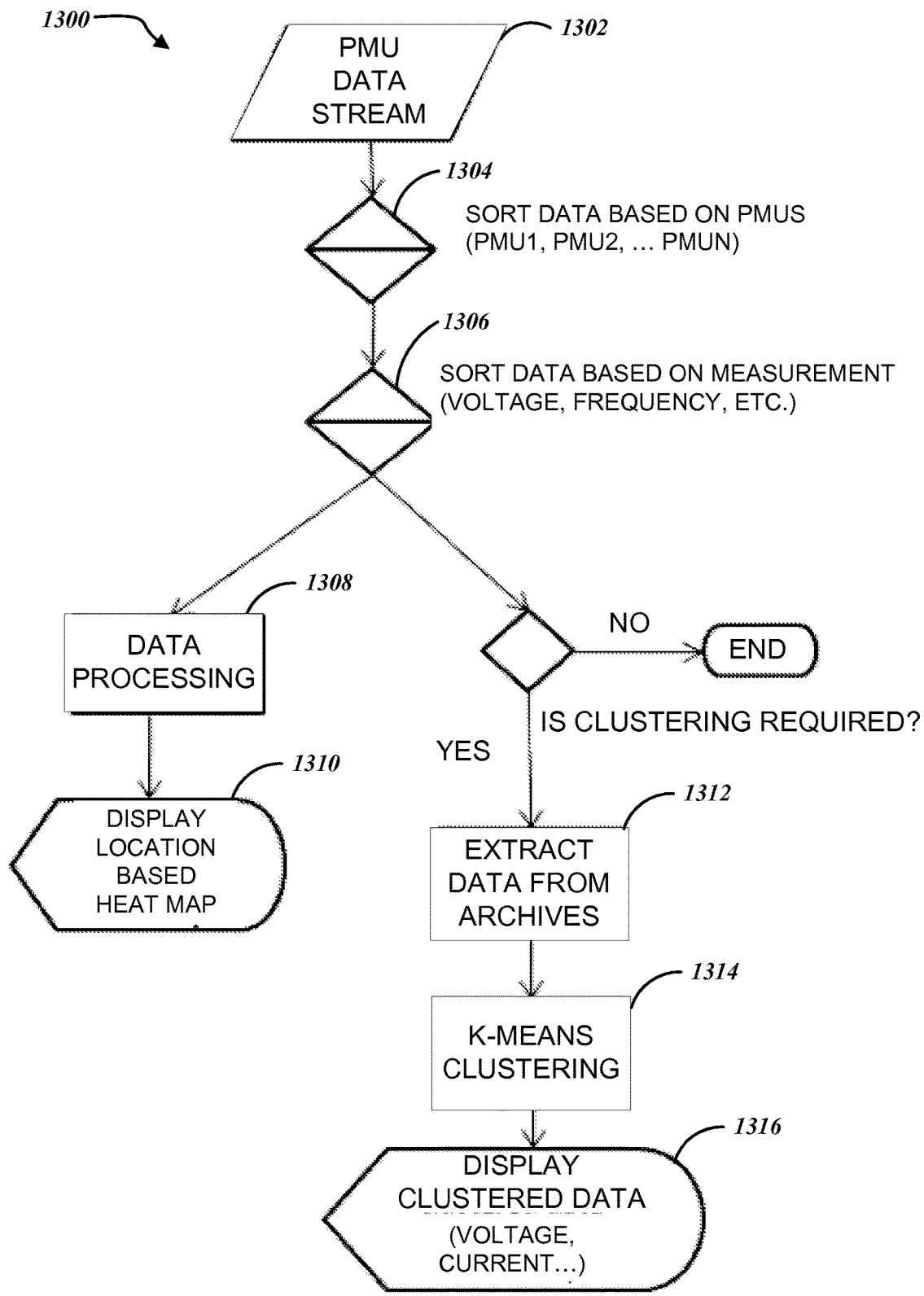
FIG. 13 is a flow diagram depicting a scheme for performing PMU data analysis, in accordance with some embodiments.

FIG. 13 is a flow diagram depicting a scheme 1300 for performing PMU data analysis. The analysis may be performed by a PDC, or a subsequent computing device that receives data from the PDC. At 1302, a PDC may be flooded with one or more streams of data from one or more PMU devices. The data received contains all the parameters from various PMU units that are connected to the PDC. At 1304, the PMU data received is sorted out based on the originating PMU device. Once the data is sorted from a PMU, at 1306 the PMU sorted data is sorted based on the type of parameter.

The data of a particular parameter (e.g., frequency or voltage magnitude) may be selected and processed at 1308. The data processing at 1308 may include an analysis of device parameters such as location (e.g., latitude, longitude), in order to allow for subsequent analysis. For example, at 1310, a location based heat map can be displayed with symbols or colors indicating the status of one or more grid equipment monitored by the PMU. Additionally, a graphical user interface may provide clustered data in any format requested by an operator. For example, the unit circle diagrams of FIG. 7, the three-dimensional scatter plot of FIG. 8 or 9, or the graphs of FIGS. 10-12.

Additionally, and in parallel, at 1312, stored data can be extracted from archives, and at 1314 the newly received and stored data can be clustered by considering different parameters such as number of samples, a specific location, or a particular time frame. At 1316 the clustered data can be displayed, and also used to form future predictions based on a combination of the received and stored data.

In large electrical grid systems, where there are multiple PMUs involved, IP networks can be employed to transport sets of data from individual PMUs between substations and control centers. Substations may be linked to each other and control centers by leased lines, privately owned synchronous optical networks (SONETs), or wireless links. Small cells of PMUs may be utilized in electrical grid networks to provide additional data gathering coverage and capacity where macro networks are overburdened.

Figure 14A:
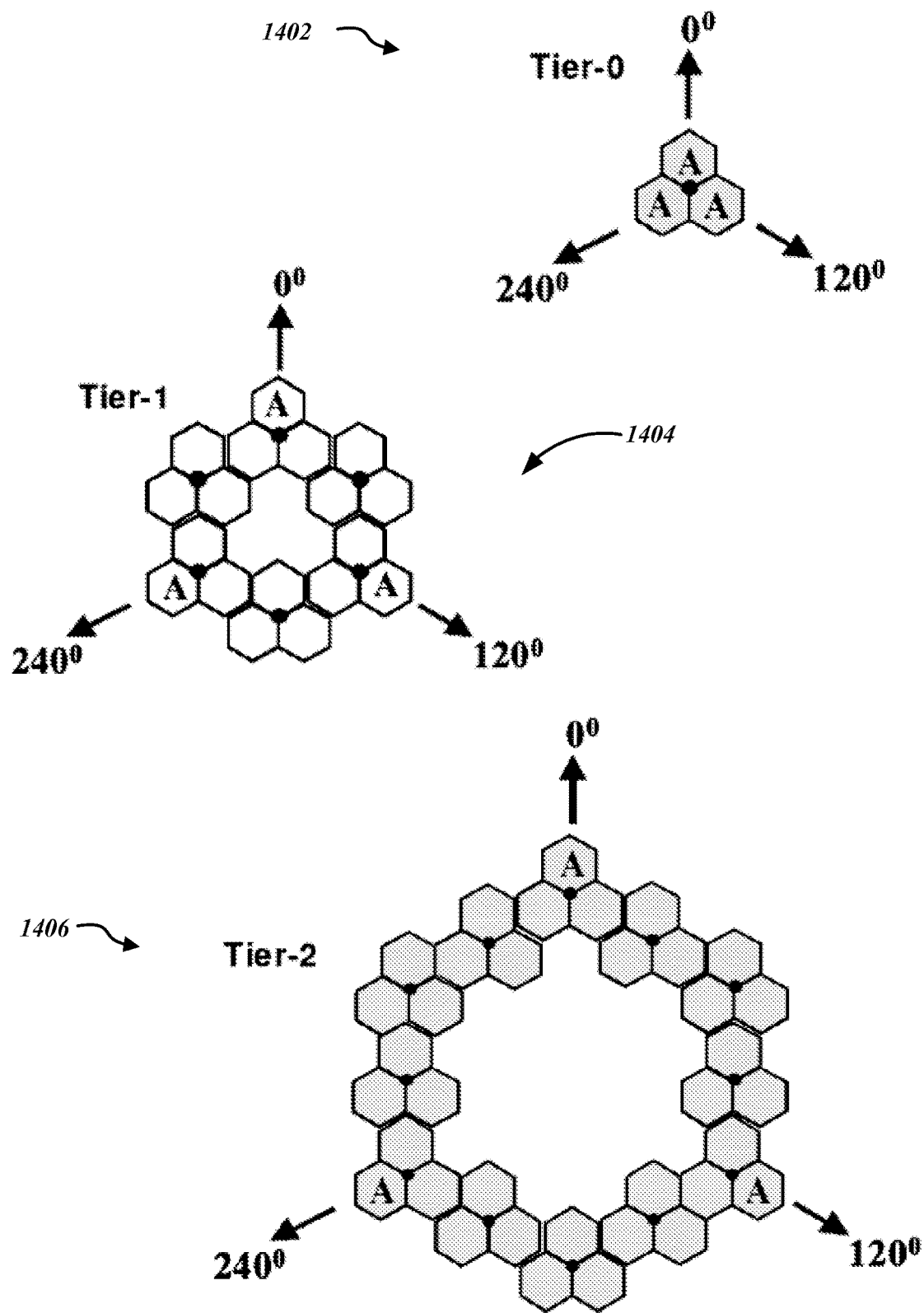
FIG. 14A depicts cell clusters in a three-tier hexagonal geometry, in accordance with some embodiments.

FIG. 14A depicts cells clustered in a three-tier hexagonal geometry. The synchrophasor or PMU includes an antenna embedded within the device that can communicate the phasor data information wirelessly to a data aggregator. At Tier-0 an individual cell 1402 includes three sectors. Directional antennas are used in each sector such that each antenna radiates into its respective 120-degree sector. This antenna directivity may be used to assigning the same frequency to all three directions, such that co-channel isolation will be increased, interference will be reduced, and the channel capacity will be increased.

A directional frequency reuse pattern that can be superimposed on a hexagonal grid to yield a given frequency only at the three corners of the triangle in each tier to provide wireless communication between devices. This technique divides up the available frequency into L×L frequency groups arranged as an L×L matrix. These L×L matrices may then be reused horizontally and vertically according to the following rule:

$$[L \times L][L \times L] \ldots$$
$$[L \times L][L \times L] \ldots$$
$$\vdots$$

where $$L = 1 + 3i,$$
$$i = 1, 2, \ldots$$

This methodology provides a frequency reuse plan where three adjacent reuses of a group form an apex of a triangle. Table 1 shows the number of frequencies needed to form an apex of a triangle.

TABLE 1

| i | L | Frequencies |
|---|----|-------------|
| 1 | 4  | 16          |
| 2 | 7  | 49          |
| 3 | 10 | 100         |
| 4 | 13 | 169         |
| 5 | 16 | 256         |
| 6 | 19 | 361         |

TABLE 1-continued

| i | L | Frequencies |
|---|----|-----|
| 7 | 22 | 484 |
| 8 | 25 | 625 |

Figure 14B:
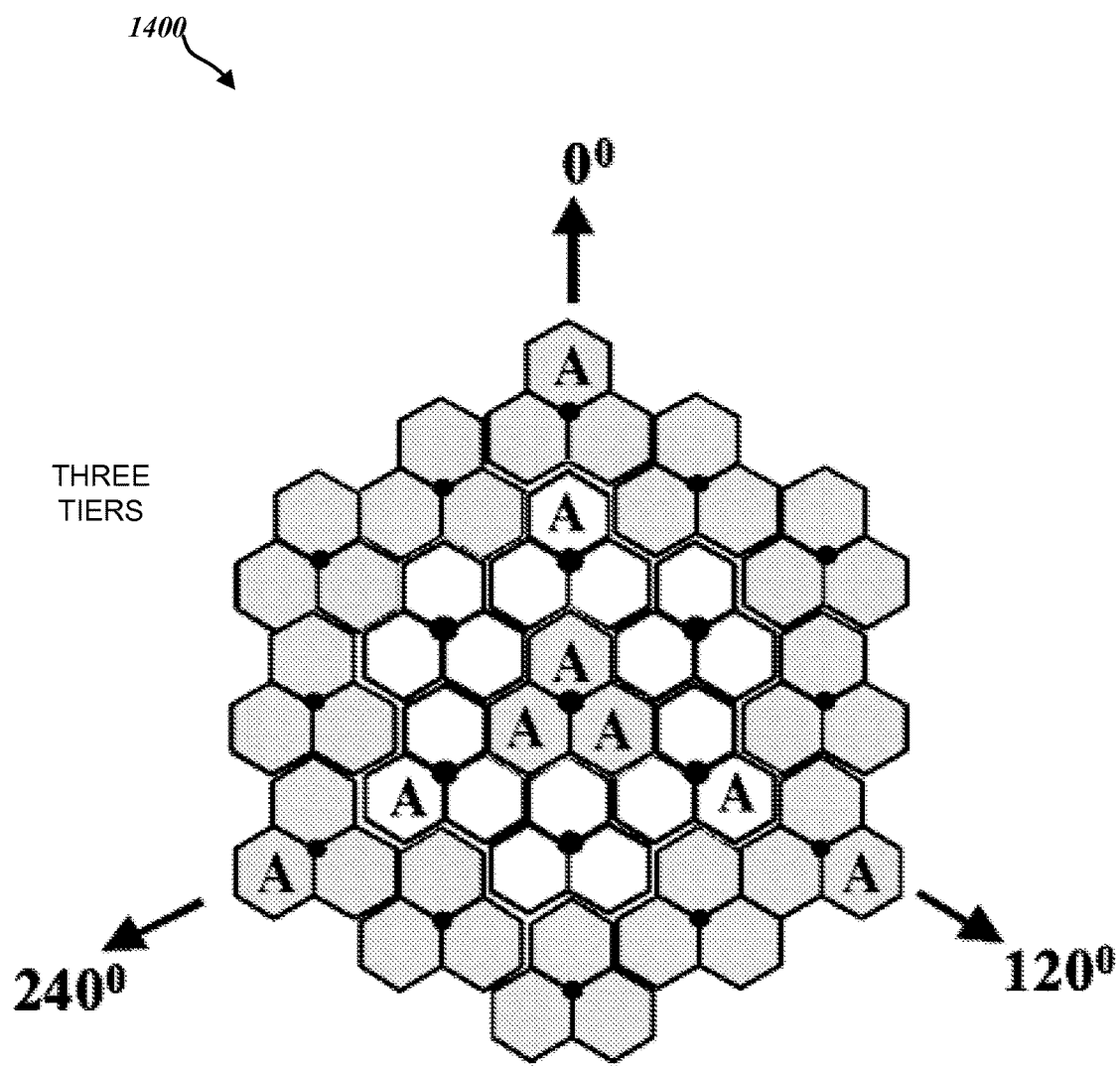
FIG. 14B depicts the clusters of FIG. 14A nested together, in accordance with some embodiments.

In every tier of hexagonal cellular geometry, there exists an apex of a triangle. FIG. 14B depicts the clusters of FIG. 14A nested together in a single hexagonal geometry 1400.

Figure 15:
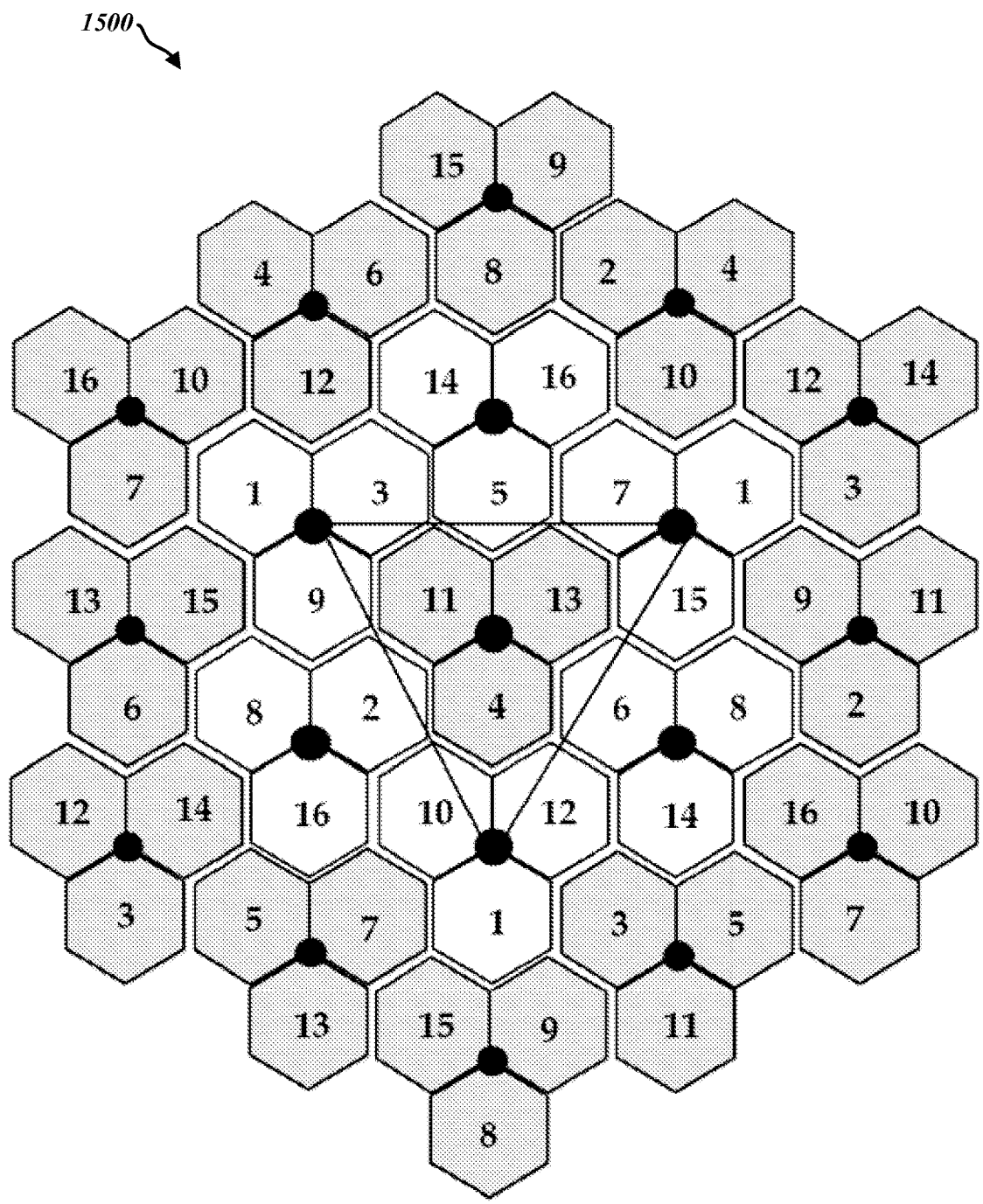
FIG. 15 depicts a frequency reuse plan for a hexagonal geometry, in accordance with some embodiments.

FIG. 15 depicts a frequency reuse plan 1500 for a hexagonal geometry, such as the tiers depicted in FIG. 14B, that forms an apex of a triangle. For example, a ten-by-ten array (i=3, L=10), as shown in TABLE 1, has 100 frequencies. Each frequency is assigned to a sector, which results in a back-to-back triangular formation of the same frequency throughout the entire hexagonal grid. The frequency plan as illustrated is then expanded as needed, in areas surrounding the first use, as required to cover a geographical area. For example, frequency group 1 radiates in a different direction, 120 degrees apart, almost back-to-back.

The frequency reuse of the proposed plan reduces interference in such a way that the effective number of interferers is reduced to less than two. The C/I of this plan may be determined as sown in FORMULA 1, $$\frac{C}{I} \geq 10 \log\left[\frac{1}{2}(\sqrt{3N})^{\gamma}\right] \approx 35 \text{ dB} \qquad \text{FORMULA 1}$$

where N=(100/3)=33.33 is the reuse factor, and γ=3.8 is the path loss slope. The path loss slope, γ, also referred to in the art as the propagation constant, is the rate of decay of signal strength as a function of distance. The scheme described herein provides a C/I of 35 dB.

Figure 16:
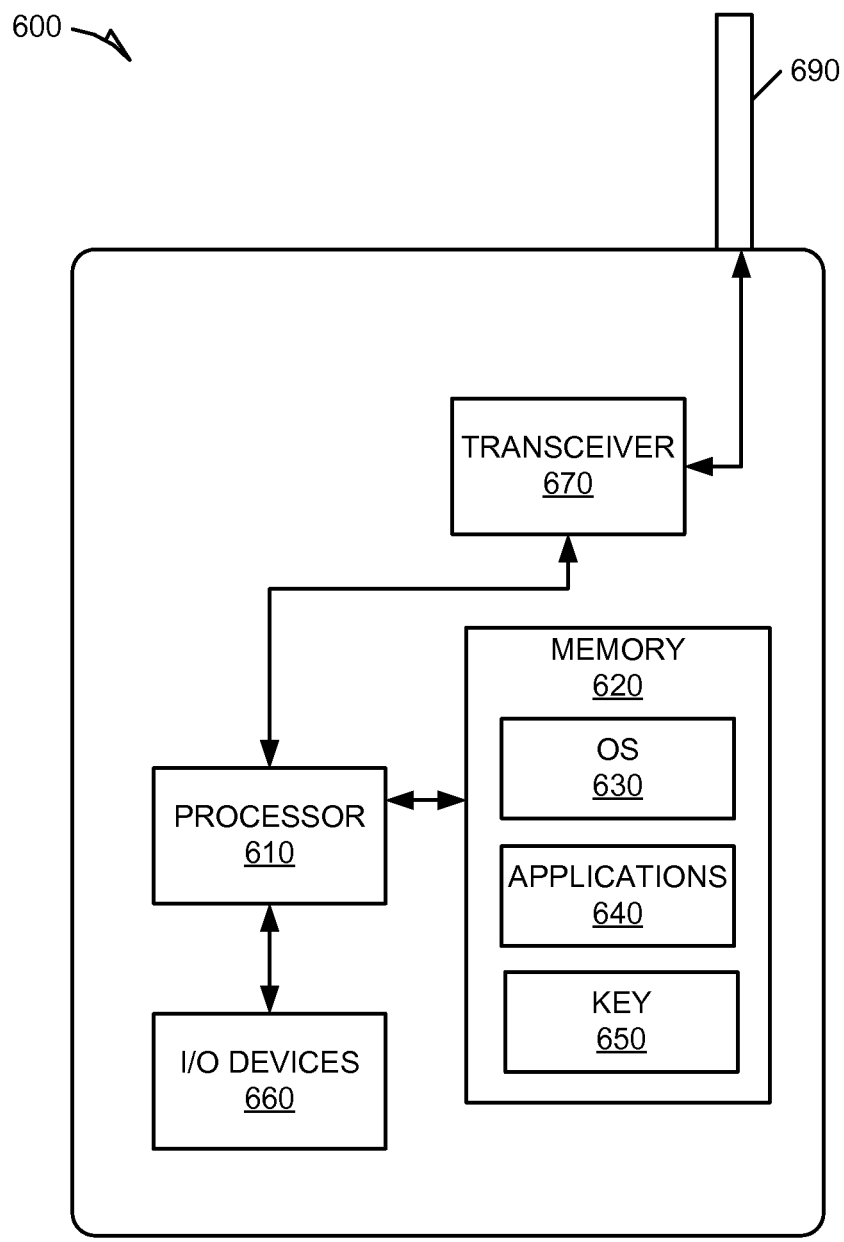
FIG. 16 is a block diagram illustrating a wireless communication device in accordance with some embodiments.

FIG. 16 is a block diagram illustrating a wireless communication device 600, upon which any one or more of the techniques (e.g., methodologies) discussed herein may be performed. The wireless communication device 600 may include a processor 610. The processor 610 may be any of a variety of different types of commercially available processors suitable for mobile devices, for example, an XScale architecture microprocessor, a Microprocessor without Interlocked Pipeline Stages (MIPS) architecture processor, or another type of processor. A memory 620, such as a Random Access Memory (RAM), a Flash memory, or other type of memory, is typically accessible to the processor 610. The memory 620 may be adapted to store an operating system (OS) 630, as well as application programs 640 and a key 650. The OS 630 or application programs 640 may include instructions stored on a computer readable medium (e.g., memory 620) that may cause the processor 610 of the wireless communication device 600 to perform any one or more of the techniques discussed herein. The key 650 may be a cryptographic key that is private or shared with one or more other devices. The key 650 may be managed and utilized by the OS 630 or the application programs 640 to communicate securely with one or more other devices. The processor 610 may be coupled, either directly or via appropriate intermediary hardware, such as a display, or to one or more input/output (I/O) devices 660, such as a keypad, a touch panel sensor, a microphone, etc. Similarly, in an example embodiment, the processor 610 may be coupled to a transceiver 670 that interfaces with an antenna 690. The transceiver 670 may be configured to both transmit and receive cellular network signals, wireless data signals, spread spectrum communication signals, encrypted communication signals, or other types of signals via the antenna 690, depending on the nature of the wireless communication device 600.

Figure 17:
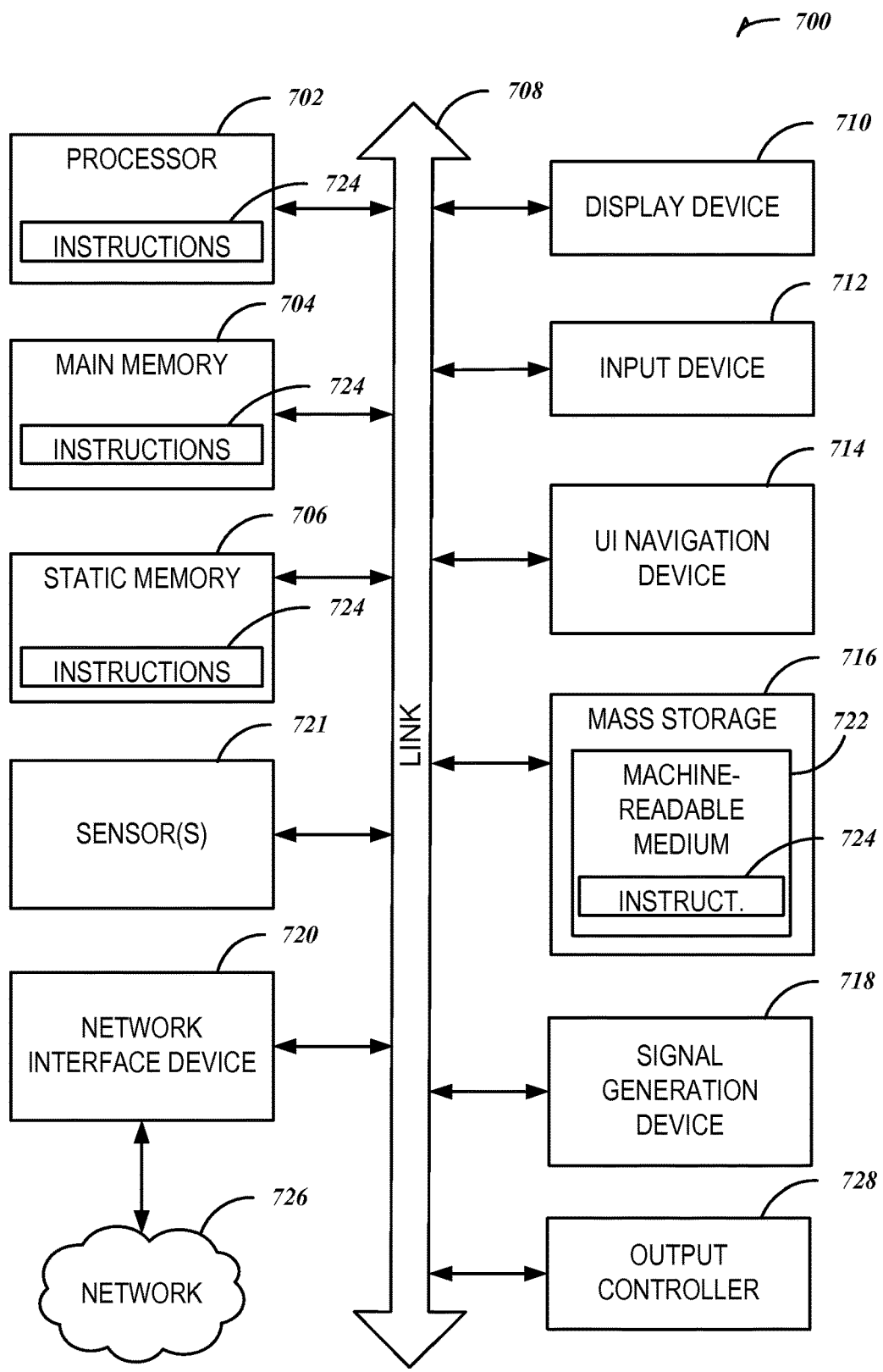
FIG. 17 is a diagrammatic representation of a machine in the example form of a computer system within which a set of instructions for causing the machine to perform any one or more of the methodologies discussed herein may be executed.

FIG. 17 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a processing unit, a graphics processing unit (GPU), a hardware processor core, or any combination thereof), a main memory 704, and a static memory 706, some or all of which may communicate with each other via a link 708 (e.g., a bus, link, interconnect, or the like). The machine 700 may further include a display device 710, an input device 712 (e.g., a keyboard), and a user interface (UI) navigation device 714 (e.g., a mouse). In an example, the display device 710, input device 712, and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, camera, video recorder, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The mass storage 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage 716 may constitute machine-readable media.

While the machine-readable medium 722 is illustrated as a single medium, the term "machine readable medium" may include a single medium or multiple media (e.g., a centralized or distributed database, and/or associated caches and servers) that configured to store the one or more instructions 724.

The term "machine-readable medium" may include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 700, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A secure communication system comprising:
 a plurality of phasor measurement units (PMUs) coupled to a power grid, the PMUs being configured to collect a plurality of data parameters from the power grid;
 a first radio including a directional antenna coupled to each one of the plurality of PMUs;
 a phasor data concentrator (PDC) configured to receive and analyze the plurality of data parameters; and
 a second radio coupled to the PDC, the second radio being configured to receive the plurality of data parameters from the first radio and provide the plurality of data parameters to the PDC;
 wherein the first radio and the second radio are spread spectrum radios configured to communicate over secure channels, the secure channels utilizing a passcode configured in the first radio and the second radio; and
 the plurality of PMUs are organized in a hexagonal geometry to provide for frequency reuse among the individual PMU devices.

2. The secure communication system of claim 1, wherein the first radio and the second radio are anti-jam (AJ) and low probability of intercept (LPI) spread spectrum radios.

3. The secure communication system of claim 1, wherein the first radio and the second radio are frequency hopping radios.

4. The secure communication system of claim 1, wherein the PDU and the PDC both include a cipher based message authentication code, and exchange the cipher based message authentication code as part of a handshake protocol before providing or receiving the plurality of data parameters.

5. The secure communication system of claim 4, wherein the PDU and the PDC are configured to ignore communications that do not include the cipher based message authentication code.

6. A method comprising:
 receiving, at a phasor data concentrator (PDC), sensor measurements from a plurality of phasor measurement units (PMUs) in a power grid, the PMUs each including a directional antenna and being configured to collect a plurality of data parameters from the power grid;
 sorting the plurality of data parameters based on individual PMUs in the plurality of PMUs;
 sorting the plurality of data parameters based on an individual parameter; and
 displaying a status of one or more grid equipment monitored by the plurality of PMUs;
 wherein the PMUs are organized in a hexagonal geometry to provide for frequency reuse among the PMU devices.

7. The method of claim 6, wherein, the PMUs each individually collect the plurality of data parameters from separate devices in the power grid.

8. The method of claim 6, wherein, the plurality of data parameters include at least one of: a voltage, a frequency, or a phase angle.

9. The method of claim 6, further comprising:
 analyzing the plurality of data parameters based on location information of grid equipment monitored by an individual PMU.

10. The method of claim 6, further comprising:
 determining an equipment status by of one or more grid equipment monitored by the plurality of PMUs based on a density based clustering analysis of the data parameters.

11. The method of claim 10, wherein the equipment status includes a unit circle diagram depicting three phi voltage phasors.

12. The method of claim 10, further comprising:
 displaying a three-dimensional representation of the data parameters based on the density clustering analysis of the data parameters.

13. At least one machine readable storage medium comprising a plurality of instructions that when executed by a computing device cause the computing device to:
 receive, at a phasor data concentrator (PDC), sensor measurements from a plurality of phasor measurement units (PMUs) in a power grid, the PMUs each including a directional antenna and being configured to collect a plurality of data parameters from the power grid;
 sort the plurality of data parameters based on individual PMUs in the plurality of PMUs;
 sort the plurality of data parameters based on an individual parameter; and
 display a status of one or more grid equipment monitored by the plurality of PMUs;
 wherein the PMUs are organized in a hexagonal geometry to provide for frequency reuse among the PMU devices.

14. The machine readable storage medium of claim 13, wherein, the PMUs each individually collect the plurality of data parameters from separate devices in the power grid.

15. The machine readable storage medium of claim 13, wherein, the plurality of data parameters include at least one of: a voltage, a frequency, or a phase angle.

16. The machine readable storage medium of claim 13, further comprising instructions that when executed by the computing device cause the computing device to:
 analyze the plurality of data parameters based on location information of grid equipment monitored by an individual PMU.

17. The machine readable storage medium of claim 13, further comprising instructions that when executed by the computing device cause the computing device to:
 determine an equipment status by of one or more grid equipment monitored by the plurality of PMUs based on a density based spatial clustering analysis of the data parameters.

18. The machine readable storage medium of claim 13, wherein the equipment status includes a unit circle diagram depicting three phi voltage phasors.

19. The machine readable storage medium of claim 13, further comprising instructions that when executed by the computing device cause the computing device to:
 display a three-dimensional representation of the data parameters based on the density clustering analysis of the data parameters.

20. An electrical power grid monitoring system comprising:

a plurality of phasor measurement units (PMUs) each including a directional antenna and being configured to collect a plurality of data parameters from equipment in the electrical power grid;

a phasor data concentrator (PDC) wirelessly coupled to the plurality of PMUs by a secure network connection, such that the PDC receives the plurality of data parameters from the PMUs over the secure network connection, the PDC configured to:

collect the plurality of data parameters from each PMU;

sort the plurality of data parameters based on individual PMUs in the plurality of PMUs;

sort the plurality of data parameters based on an individual parameter;

monitor the secure network connection for communications that lack an identifier that is determined to correspond to at least one of the plurality of PMUs;

perform a density based spatial clustering of the data parameters;

wherein the PMUs are organized in a hexagonal geometry to provide for frequency reuse among the PMU devices.

21. The system of claim 20, wherein the plurality of data parameters include at least one of: a voltage, a frequency, or a phase angle.

22. The system of claim 20, wherein the PDC is further configured to:

determine an equipment status based on the density based spatial clustering analysis of the data parameters.

* * * * *